Sept. 1, 1931.  C. W. WHITEHEAD  1,821,600
BRAKE
Filed July 17, 1929
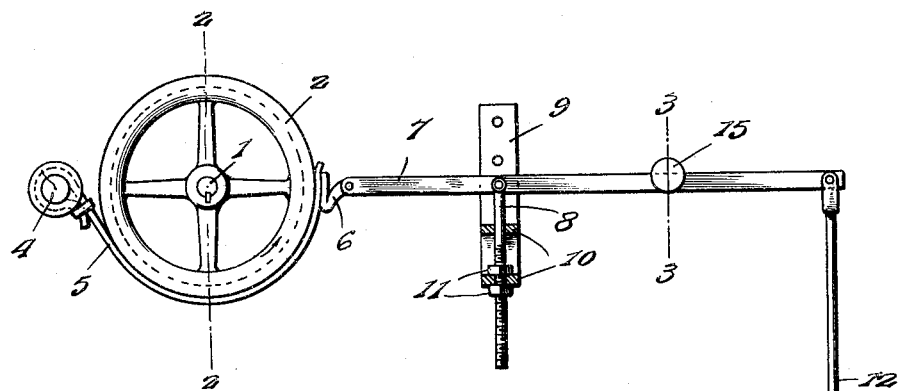
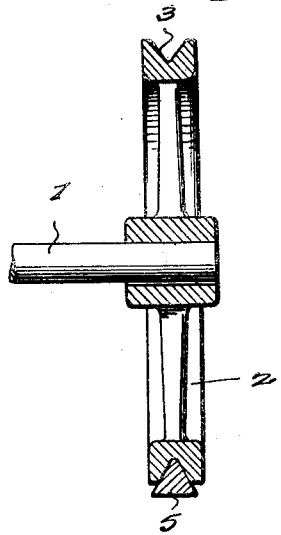
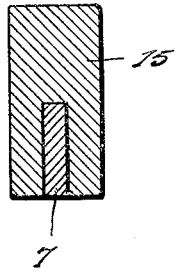
Inventor
C. W. Whitehead.
By Lacey & Lacey, Attorneys Patented Sept. 1, 1931

1,821,600

UNITED STATES PATENT OFFICE

CONNIE W. WHITEHEAD, OF CHATTANOOGA, TENNESSEE, ASSIGNOR TO NEW ERA ELECTRO DEVICES, OF CHATTANOOGA, TENNESSEE, A CORPORATION OF TENNESSEE

BRAKE

Application filed July 17, 1929. Serial No. 379,033.

The object of this invention is to provide a simple brake which will operate automatically as the machine upon which it is mounted is started or stopped. The device is intended more particularly for use upon an electrically driven loom but is, of course, applicable to any electrically driven machine. The invention is illustrated in the accompanying drawings and will be hereinafter fully set forth.

In the drawings:

Figure 1 is an elevation, with parts in section, of a brake embodying the present invention, Fig. 2 is an enlarged section on the line 2—2 of Fig. 1, and Fig. 3 is an enlarged section on the line 3—3 of Fig. 1.

In the drawings, the reference numeral 1 indicates a shaft which will ordinarily be the crank shaft of the loom. Upon one end of this shaft is secured a brake pulley or drum 2 having a V-shaped groove 3 formed in its periphery. Adjacent the wheel at one side thereof is an anchor post 4 about which is secured one end of a brake strap 5 which is also of V-shaped cross section whereby it is adapted to fit closely within the groove 3 of the brake pulley and frictionally engage and bind around the same. The opposite end of the brake strap is secured to a bracket 6 which, in turn, is secured to one end of a brake lever 7, the lever being pivoted between its ends upon a fulcrum screw or bolt 8 which is adjustably mounted in a bracket 9 rigidly secured upon the frame of the machine. The bracket 9 is provided with vertically spaced guides 10 through which the adjusting screw passes, and upon this screw above and below the lower guide are clamping nuts 11 adapted to be turned home against the guide and thereby secure the fulcrum screw in its set position. The adjustment of the screw will closely regulate the engagement of the brake strap or band with the brake pulley or drum so that the device can be set to compensate for wear and also to exert the required gripping friction upon the brake pulley and the shaft to which it is secured. To the free end of the brake lever 7 is pivoted a link or rod 12 which depends therefrom and has an armature or core 13 secured to its lower end, the link or rod being of non-magnetic material. The core or armature 13 cooperates with a solenoid or electro-magnet 14 which is in circuit with a source of current and arranged in series with the motor or equipped with a switch which is connected to the motor switch so as to operate in unison therewith. Mounted upon the brake lever between the fulcrum and the link or rod 12 is a poise 15 which may be set at any desired point in the length of the lever and thereby regulate the action of the same.

From the foregoing description, taken in connection with the accompanying drawings, it will be seen that the brake is applied by the force of gravity, the poise 15 cooperating with the weight of the link or rod 12 and the core carried thereby so that whenever the magnet or solenoid 14 is de-energized the free end of the lever will swing downward and the opposite end thereof will be swung upwardly so that the brake band will be drawn tightly about the brake pulley and the operation of the machine instantly stopped. When the motor is started, the circuit is simultaneously closed through the solenoid or magnet 14 and an upward movement immediately imparted to the core 13 so that the weighted end of the lever will be swung upwardly and the opposite end downwardly to release the brake band from the brake pulley.

It will thus be seen that whenever the motor is running the brake band will be free of the brake pulley so that the loom or other machine may operate but when the motor is stopped the solenoid is de-energized and the brake lever at once rocks so as to cause the brake band to bind upon the brake pulley. The device is exceedingly simple and may be readily applied to any machine.

Having thus described the invention, I claim:

A brake mechanism comprising a brake pulley, a post at one side of the brake pulley, a brake band disposed under and adjacent the periphery of the brake pulley, one end of said band being anchored to the post and the opposite end of the band being disposed at the opposite side of the brake pulley, a guide bracket located at the same side of the brake pulley as the free end of the brake band and spaced therefrom, an adjustable fulcrum screw fitted in said bracket, a lever pivotally mounted upon said screw and having one end connected to the free end of the brake band, a poise fitted to the lever at the side of the fulcrum screw more remote from the brake band, a non-magnetic link pivoted to and depending from the free end of the lever, a weighted core carried by the lower end of said link, and a solenoid cooperating with said core whereby when the solenoid is energized the brake band will be released from the brake pulley.

In testimony whereof I affix my signature.

CONNIE W. WHITEHEAD. [L. S.]